United States Patent [19]

Cernik

[11] 3,930,918

[45] Jan. 6, 1976

[54] METHOD OF PREPARING A STEEL CORD FOR THE MEASUREMENT OF STRESS THEREIN

[75] Inventor: Bruce Milan Cernik, Medina, Ohio

[73] Assignee: The Firestone Tire & Rubber Company, Akron, Ohio

[22] Filed: Apr. 22, 1974

[21] Appl. No.: 462,708

[52] U.S. Cl................... 156/110 R; 73/146; 156/64
[51] Int. Cl.²......................................... G01M 17/02
[58] Field of Search ............ 152/330; 73/146, 88.5; 156/64, 110 R

[56] References Cited
UNITED STATES PATENTS

| | | | |
|---|---|---|---|
| 3,245,018 | 4/1966 | Russell | 73/88.5 R X |
| 3,662,596 | 5/1972 | Siefert | 73/146 X |

*Primary Examiner*—Drayton E. Hoffman
*Assistant Examiner*—Francis J. Bartuska

[57] ABSTRACT

Disclosed is a method and apparatus for measuring stresses in a wire or wire cord, such as that found in the reinforcing belt of a pneumatic tire. A portion of the wire is encapsulated in a solder material which is machined such that a rectangular solid billet of the solder is formed thereon. A transducer or plurality of transducers in the form of strain gauges are fixed to at least one flat surface on the billet and oriented in a direction such that forces applied to the tire will affect the resistance of the transducer. The resistance of the transducer can be balanced in a bridge network and the voltage resulting therefrom suitably readout in terms of the stress being applied to the wire cord. The cord can be built into a tire with the lead wires from the transducer being fed through the tire to the bridge network. The stress tests can then be accomplished in an inflated and running tire.

3 Claims, 5 Drawing Figures

A METHOD OF PREPARING A STEEL CORD FOR THE MEASUREMENT OF STRESS THEREIN

BACKGROUND OF THE INVENTION

The invention relates to preparing a steel wire for subsequent stress testing and the apparatus for accomplishing the same. More particularly, this invention relates to providing a means by which steel cord, as is found internally of a pneumatic tire, can be tensile tested.

It is often desirable for engineers to determine stress data when metallic wire is subjected to a load. For example, tire engineers are quite interested in the stresses which fabric reinforcing cord encounters in an operating tire so that efficient tire design and performance is assured. Such data is even more critical when the steel reinforced radial ply tire is being designed because it is the deformation characteristics of the steel reinforced belt when subjected to loads that gives the radial tire its advantageous feature of low tread squirm thereby promoting low rate of wear.

Heretofore two general approaches have been taken in an attempt to obtain the stress data from a cord in a tire. In one approach the tire is conventionally built and then a layer of rubber from the inside of the tire buffed off to expose the first ply cords to which a strain gauge is applied. This procedure is somewhat useful for mapping strains in the crown to bead area of the tire and for following progressive strain states attained during inflation and during passage of the area through the tire footprint over an obstacle. However, this approach has not been totally satisfactory in that only the cords on the inner tire surface are available for the test thereby making it impossible to gather data from cords in other plies or in other areas of the tire. Further, the back side of the cord is not available for attachment of a compensating gauge, which resulted in test data which inseparably included both tensile strains and bending strains.

The other approach taken is to first apply the strain gauge to the cord and then build that cord into a test tire. While the building of the tire with cords having gauges therein is not without its problems, even more severe are the problems of properly applying the gauge to the cord prior to implant. One method which has been suggested involves splicing the cord and mechanically affixing the strain gauge to the ends of the splice. But in so doing, usually the ends of the cord must be bent sharply and/or crimped to effect the connection which not only results in inducing false stresses into the cord and promoting premature cord failure, but also results in a high probability of cord slippage under load, that is, slippage at the junctions between the gauge and the cord. In addition, the fact that the cord is rendered discontinuous also adversely affects the test results in that the stress characteristics of the gauge itself must be considered. Further, in some types of mechanical attachments of the strain gauge to the spliced cord, for example, when the ends of the wires are cemented into a hollow metallic cylinder carrying the gauge, a stiffening of the cord over a considerable distance is encountered which induces error into a subsequent tensile test.

SUMMARY OF THE INVENTION

It is thus a primary object of the present invention to provide a method and apparatus for accurately measuring stresses in a steel wire cord suitable for implanting in a pneumatic tire.

It is another object of the present invention to provide a method and apparatus, as above, in which splicing of the cord to affix a stress measuring gauge or transducer thereto is not necessary thereby eliminating the use of mechanical fasteners and slippage between the cord and the gauge.

It is a further object of the present invention to provide a method and apparatus, as above, in which the stress measuring gauge or transducer is affixed to the cord in a manner such that the behavior of the cord, under force, is unaffected.

It is an additional object of the present invention to provide a method and apparatus, as above, in which the stress measuring gauge or transducer is affixed to the cord without bending or crimping the cord and without unduly stiffening the cord.

It is yet another object of the present invention to provide a method and apparatus, as above, in which the stress measuring gauge or transducer is affixed to the cord in a manner such that premature failure of the cord is avoided.

It is still another object of the present invention to provide a method and apparatus, as above, whereby a suitably prepared cord can be placed or built into any desired area of a pneumatic tire so that tensile tests can be thereafter conducted thereon.

It is a still further object of the present invention to provide a method and apparatus, as above, whereby tensile strains in an inflated or running tire can be obtained without regard to any bending strains.

These and other objects of the present invention, which will become apparent from the description to follow, are accomplished by the improvements hereinafter described and claimed.

In general, the concept of the present invention includes first preparing a steel wire for the measurement of stresses therein by encapsulating a portion of the wire in a material, preferably a solder material. The material is then machined or otherwise formed into a billet or generally rectangular solid so that a transducer can be affixed to at least one of the flat surfaces thereof. The wire can then be built into a pneumatic tire with the lead wires of the transducer extending through the wall of the tire and connected to form one leg of a bridge network. Conventional readout equipment can detect the degree of voltage imbalance in the bridge when the cord is placed under stress which imbalance is proportional to the stress in the wire.

DESCRIPTION OF THE PREFERRED EMBODIMENT

Figure 1:
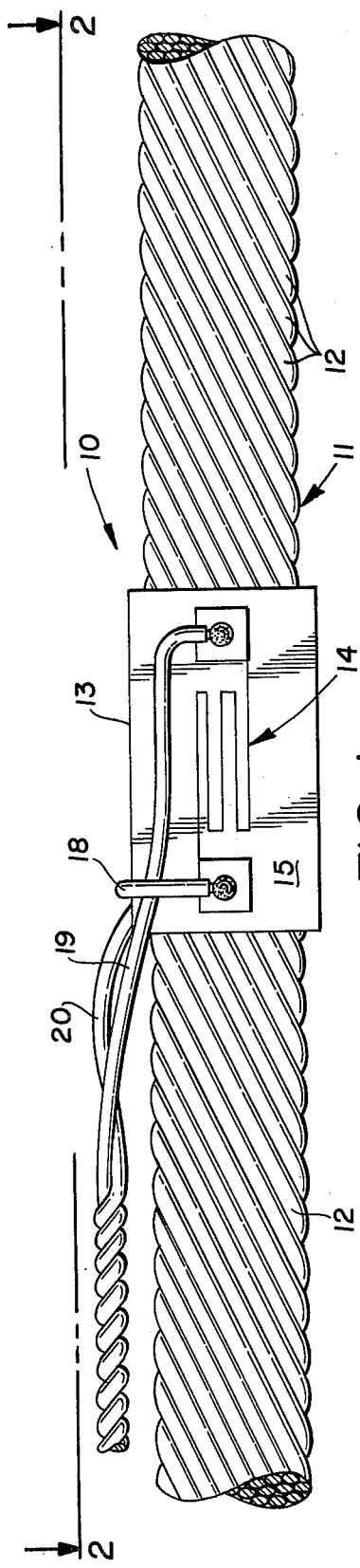
FIG. 1 is a plan view of a wire cord showing a transducer affixed thereto.
Figure 2:
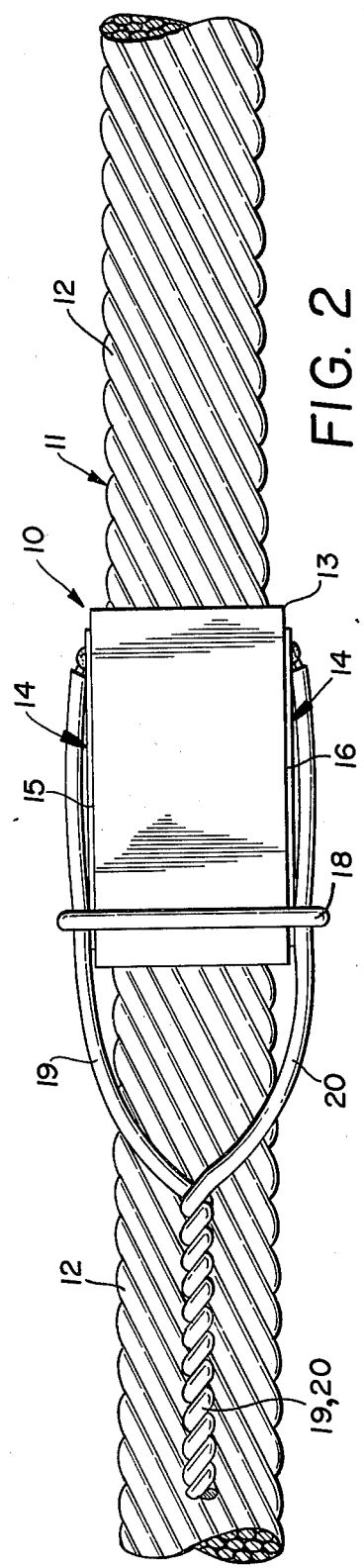
FIG. 2 is a view taken substantially along line 2—2 of FIG. 1.

Indicated generally by the numeral 10 in FIG. 1 is the assembly of a wire 11, which in its preferred form consists of a plurality of cabled metallic strands 12 or which could be a single wire strand, to which is fixed a billet 13 of material which in its preferred form is a solder material. As will be hereinafter described, billet 13 is a generally rectangular solid having a plurality of flat faces. As shown in FIGS. 1 and 2, transducers 14 in the form of conventional strain gauges, the details of which will be hereinafter described, are fixed to upper billet face 15 and lower billet face 16.

Assembly 10 is constructed in the following manner. The portion of cord 11 which is to receive the billet, usually not more than a quarter of an inch in length, is first coated with a soldering flux. A bead of commercially available silver solder, or other equivalent solder, is heated to slightly above its melting point, in most instances about 1130°F., and the fluxed portion of cord 11 is dipped or immersed into the molten solder. The solder is immediately allowed to rapidly cool thereby becoming firmly attached to the cord. In this manner the wire of the cord is not heated enough to affect its tensile or fatigue properties.

After the bead of solder has cooled it can be machined or otherwise formed into the shape of billet 13. A rectangular solid of a size of 0.04 inch by 0.06 inch by 0.25 inch has proven satisfactory for a typical billet 13. While the billet would not necessarily have to take on the shape of a rectangular solid as described, it is important that at least one and preferably two of the surfaces running in the direction of the cord 11 (surfaces 15 and 16 in the billet 13 shown) be planar to receive the strain gauges 14 thereon. While numerous types of miniature strain-gauges would be suitable for this application, a Model No. EA-13-013 DE-120 of the Micro-Measurements Division of Vishay Intertechnology, Inc., of Romulus, Michigan, has been tested and found satisfactory.

As shown and previously described, a strain gauge 14 is affixed, as by a suitable cement, to each face 15 and 16. So that all bending strains are canceled out when subjecting the cord 11 to a tensile force, the transducers are connected in series being interconnected by wire 18 extending from one end of one gauge to one end of the other gauge. Lead wires 19 and 20 extend from the other ends of gauges 14 and are coiled together to extend away from billet 13. By crossing wire 18 over wires 19 and 20, the latter are totally anchored to billet 13. The completed transducer can then be encapsulated in a coating of plastic material to protect the gauges and lead wires when they are inserted into a tire and thereafter subjected to the heat of vulcanization.

The manner in which the assembly 10 is built into a tire will now be described in detail. The tire 21 is constructed in a conventional fashion well known to one skilled in the art on a building drum 22 (FIG. 3) up to and including the laying of the ply which is to have the test cord assembly 10. At least one and preferably two of the adjacent cords in the last ply, which can be at the sidewall location or the tread location, are then exposed and carefully removed leaving the underside of the ply skim intact to form a small channel in the ply. It is advisable that the two cords be removed so that a wide enough channel is formed to receive the assembly 10 which at the point of billet 13 is, of course, somewhat bulkier than a conventional cord. The assembly 10 is then inserted in the channel so as not to interfere with any other cord, with the transducer being located at the desired circumferential position. The assembly 10 is then covered with a skim stock, taking care that the lead wires 19 and 20 are exposed. The flaps are then stitched in place in a conventional manner such that only wires 19 and 20 extend through the rubber.

Figure 3:
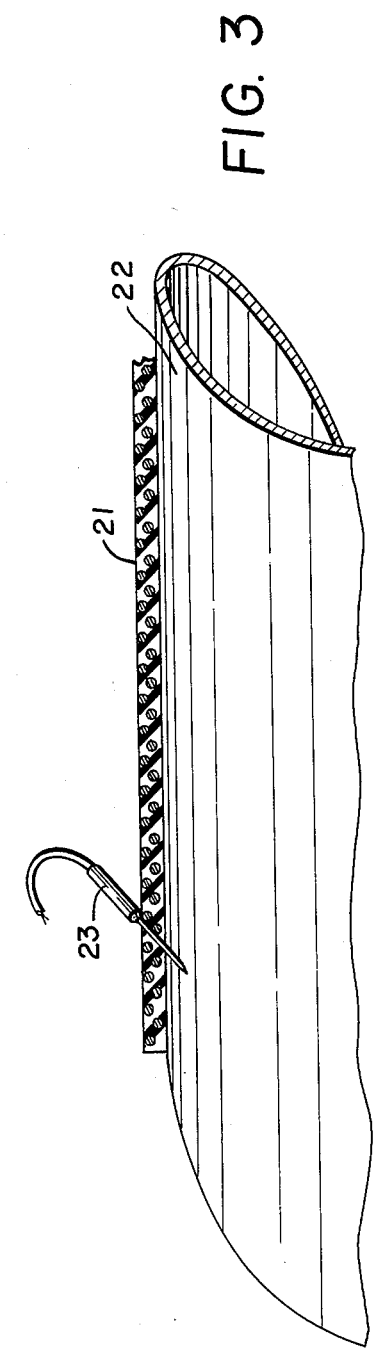
FIG. 3 is a schematic view of the manner in which the cord shown in FIG. 1 is inserted into a tire on a flat building drum.

It is now desirable to conduct wires 19 and 20 through the tire to the inside thereof so that further plies and/or tread stock may be applied to the outside of the tire and so that suitable instrumentation can readily be connected thereto, in a manner to be hereinafter described, for conducting the tensile tests. To this end, a large hypodermic needle, schematically shown as 23 in FIG. 3, is inserted through the plies angled slightly toward the bead location of the tire and inserted at a point such that it will pass very close to the billet 13 and strain gauge 14. The lead wires 19 and 20 are then inserted into needle 23 and the remainder of the needle is pushed through the tire so that the wires 19 and 20 will become exposed through the inner liner of the tire, that is, on the inside thereof. Tire construction is then completed in a conventional manner with the remaining plies and tread stock being put in place over the ply which includes the assembly 10. It is to be understood that the assembly 10 could be located in any area of the tire with an intermediate ply having been chosen solely for the purpose of this description. The tire 21 is now in condition for conventional curing and because the inside thereof is exposed to extreme temperatures and pressure, it is best to coil up wires 19 and 20 and temporarily affix them to the inner liner with a protective tape or skim stock until final shaping and curing is accomplished.

If a skim stock is used, it has been found that by wrapping the coiled wires in a cloth impregnated with a starch material and then covering the wrapped wires with skim stock, upon curing, the skim stock will bubble due to the air pocket formed therein thereby readily identifying the location of the wires and rendering them accessible.

Figure 4:
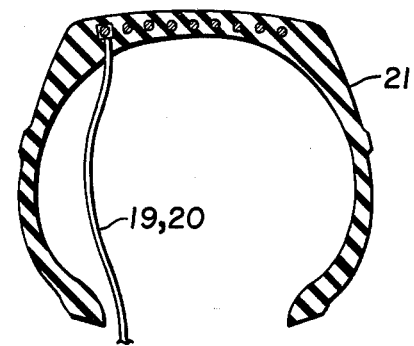
FIG. 4 is a schematic view of a finished tire having the cord shown in FIG. 1 embedded therein.

After curing, the tape or skim stock may be removed and the tire 21, having the assembly 10 encapsulated therein with lead wires 19 and 20 exposed on the inside thereof, as shown in FIG. 4, is ready for testing. First, one bead of the tire is mounted on the test wheel and wires 19 and 20 are passed through an auxiliary valve stem that is thereafter sealed to prevent air from subsequent inflation to escape. Mounting and inflation of the tire is then completed and the test wheel may then be mounted on a car or test machine for the gathering of data. In order to collect data from a rotating tire, lead wires 19 and 20 can be attached to conventional slip rings which are then connected to the instrumentation indicated generally by the numeral 30 and shown in FIG. 5.

Figure 5:
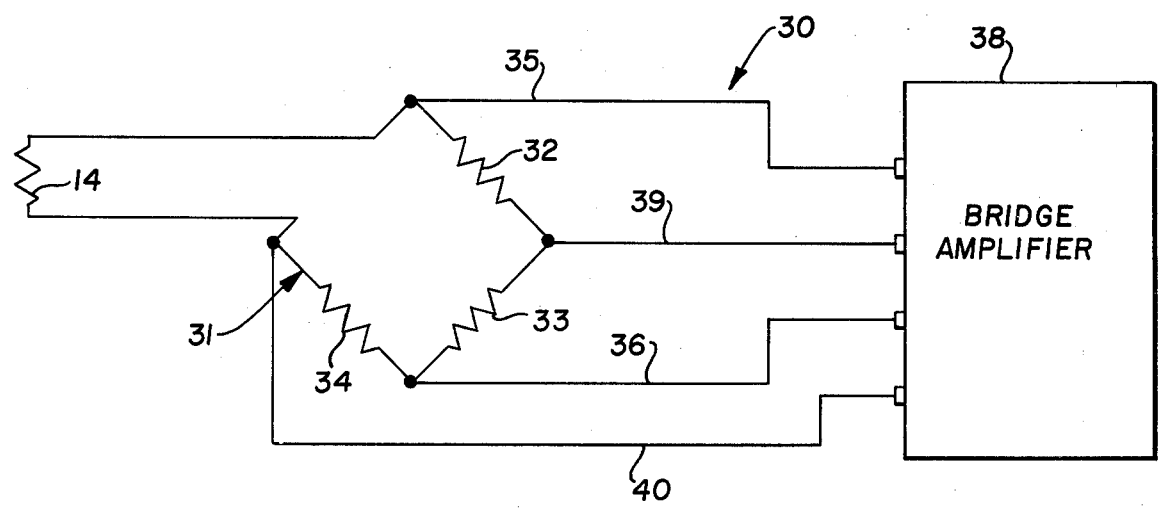
FIG. 5 is a schematic diagram of the instrumentation required to monitor and record the results of a tensile test on the cord shown in FIG. 1.

As shown in FIG. 5, strain gauges 14 act as a resistor, the resistance of which increases as a force is applied thereto. Gauge 14 therefor is used as one leg of a Wheatstone bridge network 31 which has resistors 32, 33 and 34 therein generally selected so that the resistance of each matches the total resistance of the strain gauges 14. A constant voltage is applied to the bridge 31, as through lines 35 and 36, from a voltage source in a bridge amplifier and readout instrument 38. The balance of the bridge network 31 is read by lines 39 and 40 which provide instrument 38 with a resulting signal proportional to the resistance of the gauges 14 and therefore proportional to the load being applied to the cord 11.

In order to prepare for a test, the strain gauges 14 must be calibrated. This has usually been accomplished before the assembly 10 is embedded in the tire by attaching lead wires 19 and 20 to the bridge 31 and applying a known force thereto so that the tire engineer performing the test will be able to correlate the millivolt reading on the instrument 38 to the amount of load being applied to the cord. Once so calibrated, any desired tensile test can be undertaken. For example, the tire can merely be inflated and the force read in volts on instrument 38 correlated with the inflation pressure. Similarly, readings can be obtained with respect to actual cord load while the transducer goes through the tire footprint. In short, numerous bits of information, helpful to the tire engineer, can be obtained with a great deal of accuracy when a cord assembly and test tire are constructed according to the concept of the present invention thereby substantially improving the art and otherwise accomplishing the objects of the invention.

I claim:

1. A method of preparing a steel cord for the measurement of stress therein comprising the steps of immersing a portion of the steel cord in a melted solder material thereby encapsulating the portion of the wire; permitting said solder to cool and solidify; forming at least one flat surface on said solder; placing a transducer having lead wires associated therewith on said flat surface so that stresses along the steel cord can be monitored by said transducer; building said steel cord into a tire having reinforcing cords therein by forming a channel in the tire by removing at least one of the reinforcing cords, placing said steel cord in the channel so formed, and covering said steel cord to completely encapsulate the same in the tire; conducting said lead wires of said transducer through the tire to expose the same internally of the tire; and temporarily affixing said lead wires to the inside of the tire preparatory to curing of the tire by first wrapping the same in a starch impregnated cloth and thereafter placing a skim stack over said cloth and lead wires.

2. A method according to claim 1 wherein at least two flat surfaces are formed on opposite sides of said solder and a transducer is placed on each flat surface and connected in series to cancel out bending forces.

3. A method according to claim 1 including the additional step of coating said transducer with a protective material.

* * * * *